US010048161B2

(12) United States Patent
Goto et al.

(10) Patent No.: US 10,048,161 B2
(45) Date of Patent: Aug. 14, 2018

(54) VIBRATION EXCITATION MOUNTING SYSTEM FOR AIRCRAFT

(71) Applicant: MITSUBISHI AIRCRAFT CORPORATION, Aichi (JP)

(72) Inventors: Shingo Goto, Aichi (JP); Toshiaki Sugimura, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 235 days.

(21) Appl. No.: 14/819,905

(22) Filed: Aug. 6, 2015

(65) Prior Publication Data
US 2016/0061686 A1 Mar. 3, 2016

(30) Foreign Application Priority Data

Aug. 29, 2014 (JP) .................................. 2014-175756

(51) Int. Cl.
G01M 5/00 (2006.01)

(52) U.S. Cl.
CPC ........ *G01M 5/0016* (2013.01); *G01M 5/0066* (2013.01)

(58) Field of Classification Search
CPC ...... B64D 2045/0085; B64D 2027/264; B64D 27/18; B64D 27/26; B64D 2027/266; G01M 7/00; G01M 5/0066; G01M 5/0075; G01M 5/005; G01M 5/0016; G01H 1/04; G01H 1/06; G01H 1/08; B06B 1/16–1/168; B64C 3/18; B64C 3/42; B64C 3/52; B64C 1/12; B64C 27/001; Y02T 50/12; Y02T 50/145

USPC .............. 73/667, 865.9, 147, 671, 583, 669; 702/56; 244/54, 118.2, 131
See application file for complete search history.

(56) References Cited

U.S. PATENT DOCUMENTS 3,113,451 A * 12/1963 Beals, Jr. ................ G01M 7/00
73/583
3,552,192 A * 1/1971 Grosser .................... G01M 7/00
73/583
(Continued)

FOREIGN PATENT DOCUMENTS

JP      09-20296 A      1/1997
JP      2000-321189 A   11/2000

OTHER PUBLICATIONS

US Department of Transportation Federal Aviation Administration, Aviation Maintenance Technician Handbook—Airframe, vol. 1, 2012, Chapter 1.*
(Continued)

Primary Examiner — Manish S Shah
Assistant Examiner — David L Singer
(74) Attorney, Agent, or Firm — Pearne & Gordon LLP

(57) ABSTRACT

The present invention provides a vibration excitation system which allows a vibration exciter to be easily mounted on/removed from a wing. The present invention is a vibration excitation system for an aircraft which imparts vibration to a main wing of an aircraft subjected to a test flight, for evaluation of vibration resistance to flutter. A vibration exciter which generates vibration is removably mounted on the main wing through a fixing structure. It is preferable that the fixing structure transmit the vibration of the vibration exciter as a shearing force to a front spar and a rear spar of the main wing.

16 Claims, 15 Drawing Sheets

(56) References Cited

U.S. PATENT DOCUMENTS

| | | | | |
|---|---|---|---|---|
| 3,895,515 A * | 7/1975 | Vetter | ............... | G01M 7/08 |
| | | | | 73/583 |
| 4,809,553 A * | 3/1989 | Reed, III | ............ | G01M 5/0016 |
| | | | | 73/147 |
| 5,314,308 A * | 5/1994 | Reed, III | ............. | B64C 27/001 |
| | | | | 416/23 |
| 5,804,697 A * | 9/1998 | Banaszak | ............... | G01P 21/00 |
| | | | | 73/1.82 |
| 2006/0226291 A1 * | 10/2006 | Law | .................. | B64C 3/18 |
| | | | | 244/123.7 |
| 2007/0164161 A1 * | 7/2007 | Harris | ................. | B64C 1/12 |
| | | | | 244/132 |
| 2010/0133376 A1 * | 6/2010 | Foyer | ................ | B64D 27/26 |
| | | | | 244/54 |
| 2014/0092206 A1 * | 4/2014 | Boucourt | .............. | B64D 47/08 |
| | | | | 348/36 |

OTHER PUBLICATIONS

Kehoe, NASA Technical Memorandum 4720 A Historical Overview of Flight Flutter Testing, 1995.*
Vernon, NASA Technical Memorandum 4512 In-flight Investigation of a Rotating Cylinder-Based Structural Excitation System for Flutter Testing, 1993.*
Otiefy et al, Wing box transonic-flutter suppression using piezoelectric self-sensing diagonal-link actuators, 2010.*
Heyman et al, NASA Technical Paper 1020 Theoretical Parametric Study of the Relative Advantages of Winglets and Wing-Tip Extensions, 1977.*

* cited by examiner

VIBRATION EXCITATION MOUNTING SYSTEM FOR AIRCRAFT

BACKGROUND OF THE INVENTION

Field of the Invention

The present invention relates to a vibration excitation system which is mounted on a wing of an aircraft to test the flutter resistance of the wing.

Description of the Related Art

Various tests and inspections are performed in the process of development and manufacturing of a new model of aircraft. In this context, during testing in the developmental stage, the vibration resistance of the airframe of an aircraft is evaluated by intentionally causing vibration which can occur to the airframe as it is subjected to aerodynamic resistance during flight (e.g., Japanese Patent Laid-Open No. 2000-321189).

To mention a more specific location, flutter can occur to the wing of an aircraft during flight. That is, since the wing can be regarded as an elastic body, when the flight velocity is low, elastic vibration occurring during flight is damped by aerodynamic forces. However, when the velocity reaches a certain limit, aerodynamic forces conversely contribute to vibration of the wing, and flutter occurs. Therefore, a vibration exciter is mounted on the wing of an aircraft subjected to a test flight, and this vibration exciter is driven during flight to evaluate the vibration resistance of the wing. Hereinafter, an aircraft subjected to a test flight may be referred to as a flight test aircraft.

One of the requirements for the vibration exciter to be mounted on a test aircraft is that the energy of vibration generated by the vibration exciter is transmitted efficiently to the wing. This is to avoid failure of the proper evaluation of the vibration resistance of the wing due to only smaller energy than that of the vibration of the vibration exciter being transmitted to the wing.

Next, since the vibration exciter, if left mounted, may hinder other tests performed on the test aircraft, it is desirable that the vibration exciter be removed from the wing upon completion of the test on flutter of the wing. From this perspective, the vibration exciter is required to be easily mounted on/removed from the wing.

Accordingly, the present invention aims to provide a vibration excitation system which allows a vibration exciter to be easily mounted on/removed from a wing, as well as to provide a vibration excitation system for an aircraft which can efficiently transmit the vibration generated in the vibration exciter to a wing.

SUMMARY OF THE INVENTION

A vibration excitation system for an aircraft of the present invention is a system which imparts vibration to one or both of a main wing and a tail of an aircraft subjected to a test flight, for evaluation of vibration resistance to flutter, wherein a vibration exciter which generates the vibration is removably mounted on one or both of the main wing and the tail through a fixing structure.

According to the present invention, since the vibration exciter is removably mounted on one or both of the main wing and the tail through the fixing structure, it is possible to remove the vibration exciter alone while leaving the fixing structure mounted on one or both of the main wing and the tail (hereinafter may be collectively referred to as a wing). If the vibration exciter is to be mounted directly on a wing, the burden of the mounting/removal work of the vibration exciter is greater, as it is sometimes necessary to mount the vibration exciter on locations where the mounting/removal is not easy. The mounting/removal of the vibration exciter can be made easy with the fixing structure, which does not require frequent mounting/removal, serving at such locations where the mounting/removal is not easy.

In the vibration excitation system of the present invention, it is preferable that the fixing structure transmit the vibration of the vibration exciter as a shearing force to a front spar and a rear spar of one or both of the main wing and the tail.

Since the front spar and the rear spar are structural members which bear loads applied to the main wing and the tail (hereinafter may be collectively referred to as a wing), when the vibration generated in the vibration exciter is transmitted to the front spar and the rear spar, the vibration can be transmitted efficiently to the wing. Moreover, if the vibration is transmitted as a shearing force to the front spar and the rear spar which are provided at an interval in the front-rear direction, the vibration can be transmitted more efficiently to the wing.

In the vibration excitation system of the present invention, it is preferable that the fixing structure transmit the vibration of the vibration exciter to the front spar and the rear spar along a direction of vibration of one or both of the main wing and the tail which matches a direction required for evaluation of the vibration resistance. That is, it is possible to impart the vibration of the vibration exciter in a direction favorable for the vibration of the wing by adjusting the shape of the fixing structure.

In the vibration excitation system of the present invention, it is preferable that a fixing structure have a box structure in order to transmit the vibration efficiently to the wing.

In the vibration excitation system of the present invention, it is preferable that the vibration exciter be mounted on the fixing structure through a fitting and is mounted/removed along with the fitting.

This is to deal with cases where it is required to mount the vibration exciter on the fixing structure using the fitting depending on the position at which the vibration exciter is disposed.

In the vibration excitation system of the present invention, in the case where the present invention is applied to a main wing having a winglet, the vibration exciter can be mounted through the fixing structure, in the vicinity of a tip of the main wing having the winglet at the tip.

In the vibration excitation system of the present invention, in addition to the vibration exciter, a single or a plurality of devices used for other tests can be mounted on the fixing structure.

Sharing a fixing structure among the vibration exciter and other devices can improve the convenience in mounting the other devices.

However, it is preferable that the vibration exciter can be mounted on/removed from the fixing structure independently of a single or a plurality of the devices. This is to deal with test modes which do not use the vibration exciter but do use other devices.

Sharing the fixing structure with other devices is effective especially when the vibration exciter is provided on a vertical tail through the fixing structure.

According to the present invention, since the vibration exciter is removably mounted on one or both of a main wing and a tail through the fixing structure, the mounting/removal of the vibration exciter can be made easy as the fixing structure serves at locations where the vibration exciter is not easy to mount.

According to the present invention, since the vibration of the vibration exciter is transmitted to the front spar and the rear spar which are structural members bearing loads applied to the wing, the vibration generated in the vibration exciter can be transmitted efficiently to the wing.

DETAILED DESCRIPTION OF THE PREFERRED EMBODIMENTS

In the following, embodiments of the present invention will be described with reference to the accompanying drawings.

The embodiments include two embodiments: one is an embodiment in which a vibration excitation system of the present invention is applied to a main wing 3 of an aircraft 1, and the other is an embodiment in which the vibration excitation system is applied to a vertical tail 5 of the aircraft 1. The first embodiment applied to the main wing 3 and the second embodiment applied to the vertical tail 5 will be described below in this order. The front side and the rear side used in the following description are identified with reference to the flight direction of the aircraft 1, and the upper side and the lower side are identified with reference to the flight attitude of the aircraft 1.

First Embodiment

Figure 1:
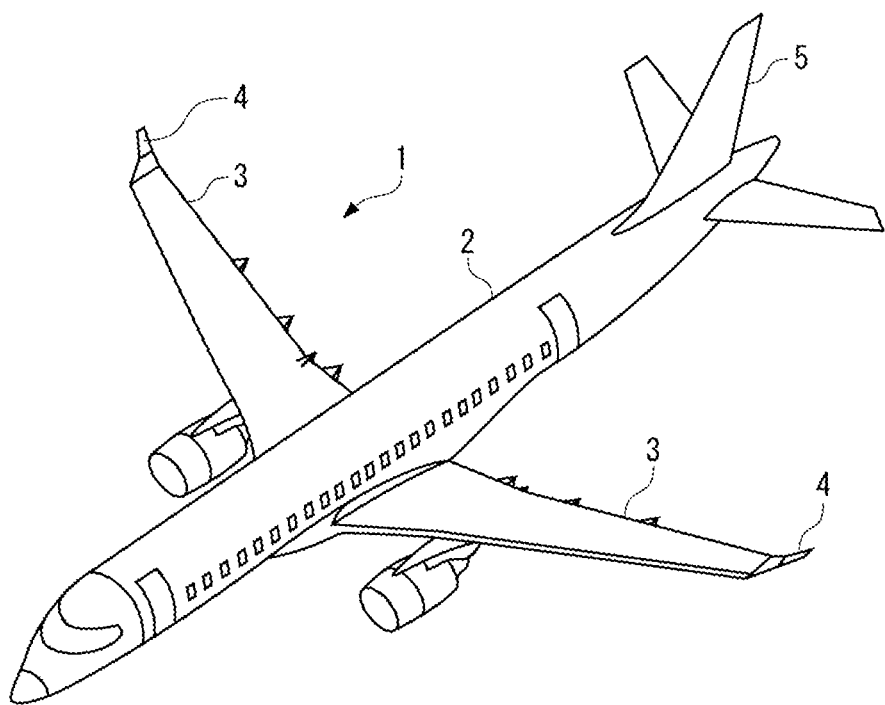
FIG. 1 is a view showing an aircraft to which embodiments of the present invention are applied.

The first embodiment proposes a vibration excitation system 20 which is easy to mount on/remove from a main wing 3 and can transmit vibration efficiently to the main wing 3. As shown in FIG. 1, an aircraft 1 includes a pair of main wings 3 on both sides of a fuselage 2 in the width direction. The aircraft 1 is used as a test machine.

The main wing 3 has a box structure with a front spar 11 and a rear spar 12 (for both, see FIG. 7) provided on the inside. Each main wing 3 has a winglet 4 mounted at the tip. The winglet 4 is mounted for its effects of reducing wingtip vortex of the main wing 3 or shifting its direction of generation upward, and thereby reducing the air resistance on the main wing 3 and, as a result, improving the fuel efficiency.

Figure 2A:
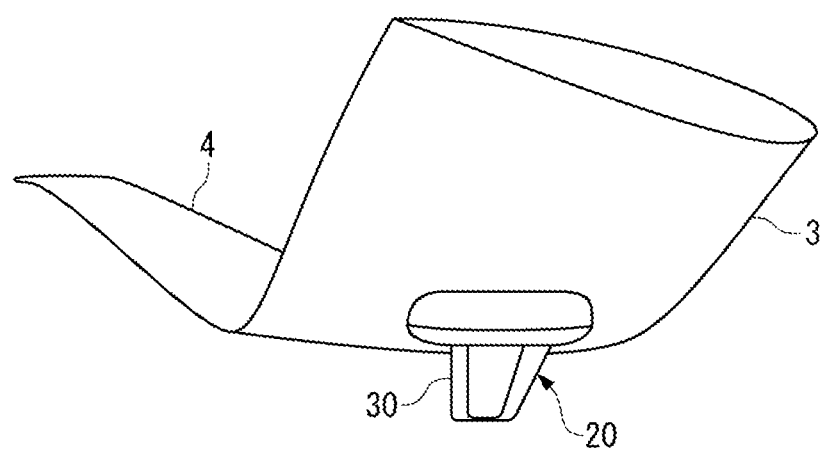
FIG. 2A is a view of a back surface of a main wing from the side of a fuselage, showing the vicinity of a winglet mounted at the tip of the main wing in a first embodiment.
Figure 2B:
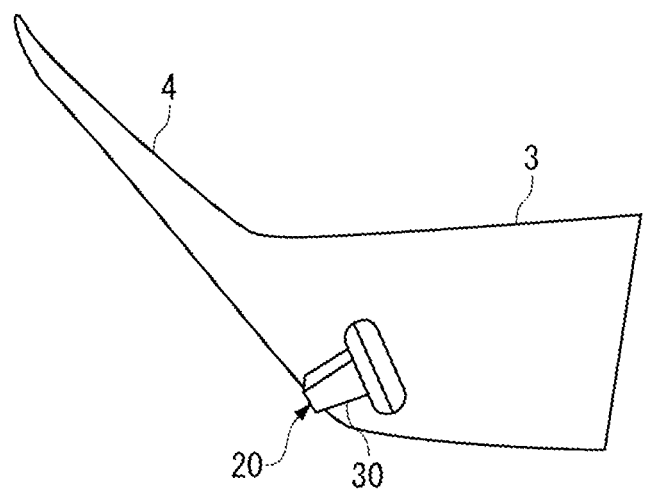
FIG. 2B is a view of the back surface of the main wing from below, showing the vicinity of the winglet mounted at the tip of the main wing in the first embodiment.

The vibration excitation system 20 of the first embodiment which is provided on the main wing 3 is used for forcibly exciting vibration in the main wing 3 of the aircraft 1 subjected to a test flight, and evaluating the vibration resistance of the main wing 3 to flutter. As shown in FIGS. 2A and 2B, the vibration excitation system 20 is provided on the lower surface of the main wing 3, in the vicinity of the tip of the main wing 3 on its border with the winglet 4.

[Vibration Excitation System 20]

Figure 3:
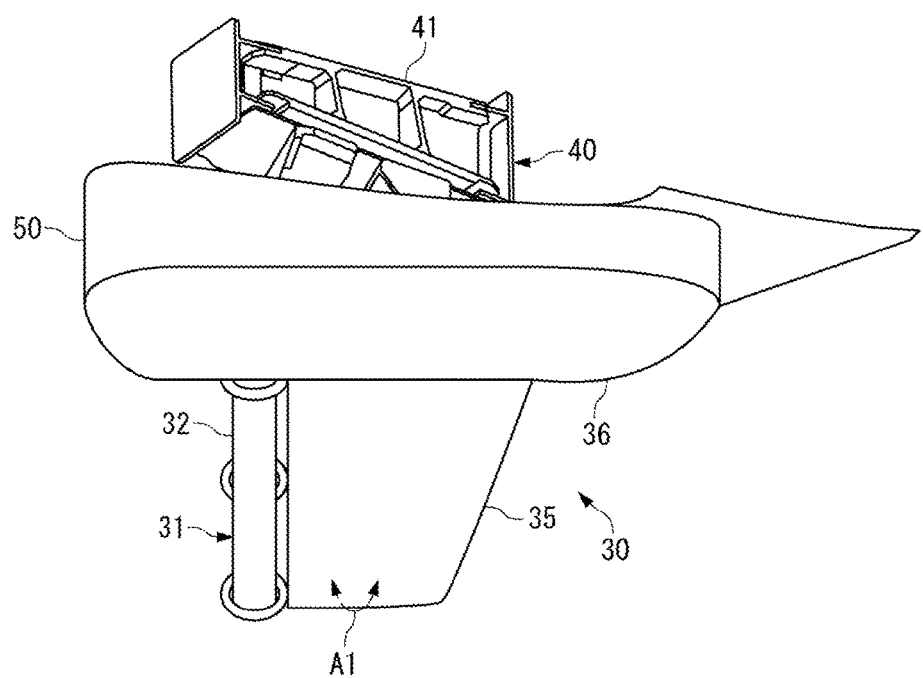
FIG. 3 is a view showing a state where relevant members are mounted on a vibration exciter of the first embodiment.

As shown in FIG. 2A, FIG. 2B and FIG. 3, the vibration excitation system 20 includes a vibration exciter 30, a fixing structure 40 for mounting the vibration exciter 30 on the main wing 3, and a fairing 50 covering a border portion between the vibration exciter 30 and the fixing structure 40. In the case where the aircraft 1 undergoes a test relating to flutter, all the elements of the vibration excitation system 20, namely, the vibration exciter 30, the fixing structure 40, and the fairing 50 are mounted. Meanwhile, in other cases, for example, where another test is performed and the result of the another test may be affected, the vibration exciter 30, a fitting 45 of the fixing structure 40, and the fairing 50 are removed. However, in these cases as well, a framework 41 of the fixing structure 40 is left mounted. That is, the vibration exciter 30 is mounted on/removed from the main wing 3 along with the fitting 45 and the fairing 50, but the framework 41 is left mounted on the main wing 3.

[Vibration Exciter 30]

The vibration exciter 30 generates vibration, and this vibration is transmitted to the main wing 3 through the fixing structure 40.

Figure 4:
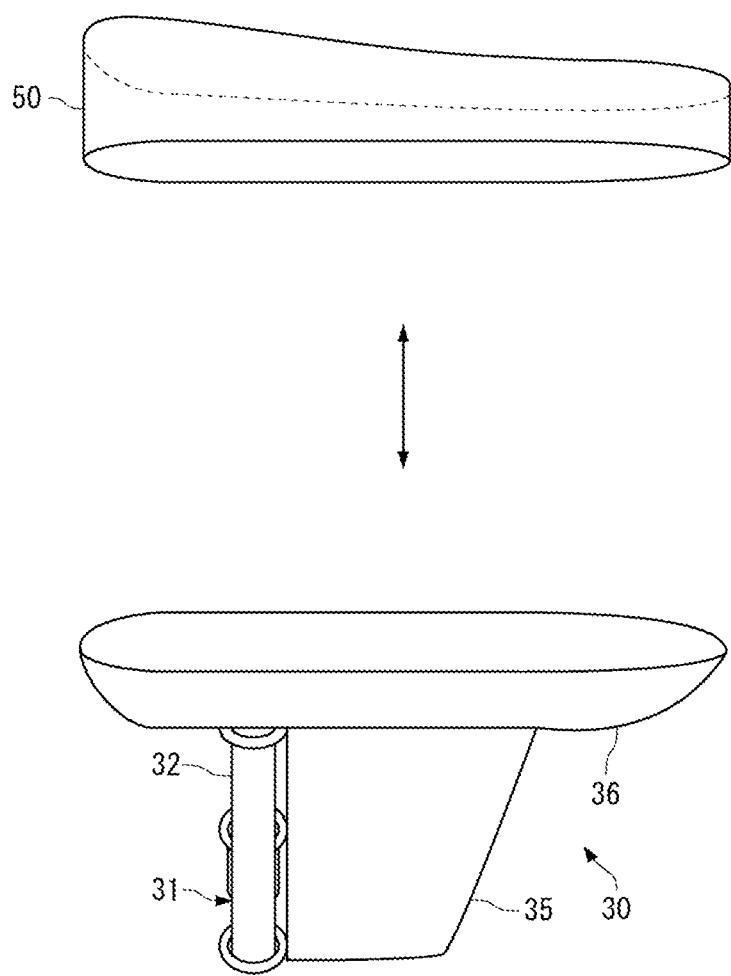
FIG. 4 is a view showing a vibration excitation device and a fairing of the first embodiment in a disassembled state with a fixing structure removed.

As shown in FIG. 3 and FIG. 4, the vibration exciter 30 includes a vibration source 31 which generates vibration, a wing-shaped airflow control wing 35 which is disposed further on the front side than the vibration source 31, and a fairing 36 on which the vibration source 31 and the airflow control wing 35 are integrally provided.

The main wing 3 of the aircraft 1 has the winglet 4 mounted at the tip. Therefore, the vibration exciter 30 is provided on the lower surface of the main wing 3, at a position closer to the fuselage 2 than to the tip of the main wing 3 where the winglet 4 is mounted.

[Vibration Source 31]

The vibration source 31 is hung down from the fairing 36, and includes a circular cylindrical case 32 and a circular columnar airflow deflection body (not shown) on the inside of the case 32. The airflow deflection body is supported rotatably around a rotation axis which extends along the vertical direction. The airflow deflection body has a slit, through which an airflow having passed through the airflow control wing 35 flows in and is discharged, formed along the radial direction. Vibration is generated by continuously changing the rotation angle of the airflow deflection body and thereby continuously changing the direction in which the airflow is discharged. The frequency of the vibration to be generated can be adjusted by changing the rotation speed of the airflow deflection body.

Thus, this embodiment uses a rotating cylinder-type vibration source with an air passage slot as the vibration source 31, but the vibration exciter of the present invention is not limited to this example, and various types of vibration exciters, for example, such as an inertial vibration excitation type and an aerodynamic vibration excitation type can be used. The inertial vibration excitation type is a type of a vibration exciter which rotates an unbalance mass by using the unbalance mass driven by a hydraulic or an electric motor, and the aerodynamic vibration excitation type is a type of a vibration exciter which rotates an aerodynamic vane.

[Airflow Control Wing 35]

The airflow control wing 35 is located further on the front side than the vibration source 31, and serves to prevent the vibration source 31 from directly receiving an airflow and to lead an airflow hitting the leading edge of the aircraft 1 during flight into a flow along the surface of the airflow control wing 35 so that the passing airflow is easily led to the airflow deflection body on the inside of the case 32.

The airflow control wing 35 is substantially as tall as the case 32 so that the above effect can be obtained over the entire area in the height direction of the vibration source 31.

If the vibration source 31 is started while the aircraft 1 is flying, as indicated by the arrow A1 in FIG. 3, this vibration appears as a swinging motion around a root portion where the vibration source 31 and the airflow control wing 35 adjoin to the fairing 36. This vibration transmits through the fitting 45 to the framework 41, so that the vibration occurs in the framework 41 as indicated by the arrow A2 in FIG. 7.

[Fixing Structure 40]

Next, the fixing structure 40 will be described with reference to FIG. 5, FIG. 6A and FIG. 6B.

The fixing structure 40 fixes the vibration exciter 30 on the main wing 3, and transmits the vibration generated in the vibration exciter 30 to the main wing 3.

The fixing structure 40 includes the framework 41 which transmits the vibration of the vibration exciter 30 to the main wing 3, and the fitting 45, one end of which is fixed on the framework 41 and on the other end of which the vibration exciter 30 is fixed. The fitting 45 is fixed with a fastener on the framework 41, and can be mounted on/removed from the framework 41.

[Framework 41]

The framework 41 has the structure of a box combining a pair of vertical walls 42, 42, a pair of horizontal walls 43, 43, and a pair of joining walls 44F, 44R, and each pair is disposed at a predetermined interval. When the framework 41 is mounted at a predetermined position, the vertical walls 42, 42 are disposed along the vertical direction, and the horizontal walls 43, 43 are disposed along the horizontal direction. The vertical walls 42, 42, the horizontal walls 43, 43, and the joining walls 44F, 44R can be composed of an appropriate metal material such as aluminum alloy, stainless steel, or structural steel, and these walls can be joined with one another by an appropriate method such as fastening or welding.

The vertical walls 42, 42 are formed as an intercostal to enhance the buckling strength or support lateral loads. The width of the vertical walls 42, 42 decreases from one end toward the other end. As will be described in detail later, the framework 41 is mounted inside the main wing 3, with the wider side of the vertical walls 42, 42 disposed on the front side and the narrower side disposed on the rear side.

The horizontal walls 43, 43 are disposed at both ends in the width direction of the vertical walls 42, 42 (at both ends in the upper-lower direction in FIG. 5, FIG. 6A and FIG. 6B), and cover the vertical walls 42, 42 from both ends in the width direction. The horizontal walls 43, 43 have a rectangular shape with a constant width.

The joining walls 44F, 44R are disposed at both ends in the longitudinal direction of the framework 41, and cover the vertical walls 42, 42 from both sides in the longitudinal direction. The joining walls 44F, 44R are portions which are joined to mating members (front spar 11 and rear spar 12) on which they are mounted, when the framework 41 is mounted on the main wing 3. While the joining wall 44F and the joining wall 44R are both formed of a substantially square, flat plate material, the dimension of the joining wall 44F is larger than that of the joining wall 44R. This is because the dimensions of the joining walls 44F, 44R correspond to the dimensions of a web 11W of the front spar 11 and a web 12W of the rear spar 12 to which the joining walls 44F, 44R are joined respectively. This will be described in detail later.

Thus, since the framework 41 has a box shape with its six sides composed of a plate material as described above, it can secure high rigidity and reliably transmit the vibration of the vibration exciter 30 to the main wing 3.

[Fitting 45]

The fitting 45 includes a pair of upper fittings 47, 47 and a pair of lower fittings 49, 49. The upper fittings 47, 47 and the lower fittings 49, 49 can be composed of an appropriate metal material such as aluminum alloy, stainless steel, or structural steel.

The upper fittings 47, 47 are fixed at a predetermined interval on the horizontal wall 43 located on the lower side of the framework 41. Although not shown, the upper fittings 47, 47 are fixed by bolt fastening. The lower fittings 49, 49 are respectively fixed at the lower ends of the upper fittings 47, 47. The lower fittings 49, 49 are also fixed by bolt fastening.

As shown in FIG. 3 and FIG. 4, the vibration exciter 30 is fixed at the lower ends of the lower fittings 49, 49. The vibration exciter 30 is also fixed by bolt fastening.

Thus, the upper fittings 47, 47 can be mounted on/removed from the framework 41, and the upper fittings 47, 47, and the lower fittings 49, 49 can be mounted on/removed from each other, and the lower fittings 49, 49 and the vibration exciter 30 can be mounted on/removed from each other.

In this example, the fitting 45 is composed of the two members, the upper fittings 47 and the lower fittings 49. This is because, since the fitting 45 has a twisted shape due to the direction of the vibration exciter 30 relative to the framework 41, the fitting 45 composed of two members, rather than an integral fitting 45, is easier to manufacture. Therefore, this embodiment embraces the use of an integrally produced fitting as well.

Figure 5:
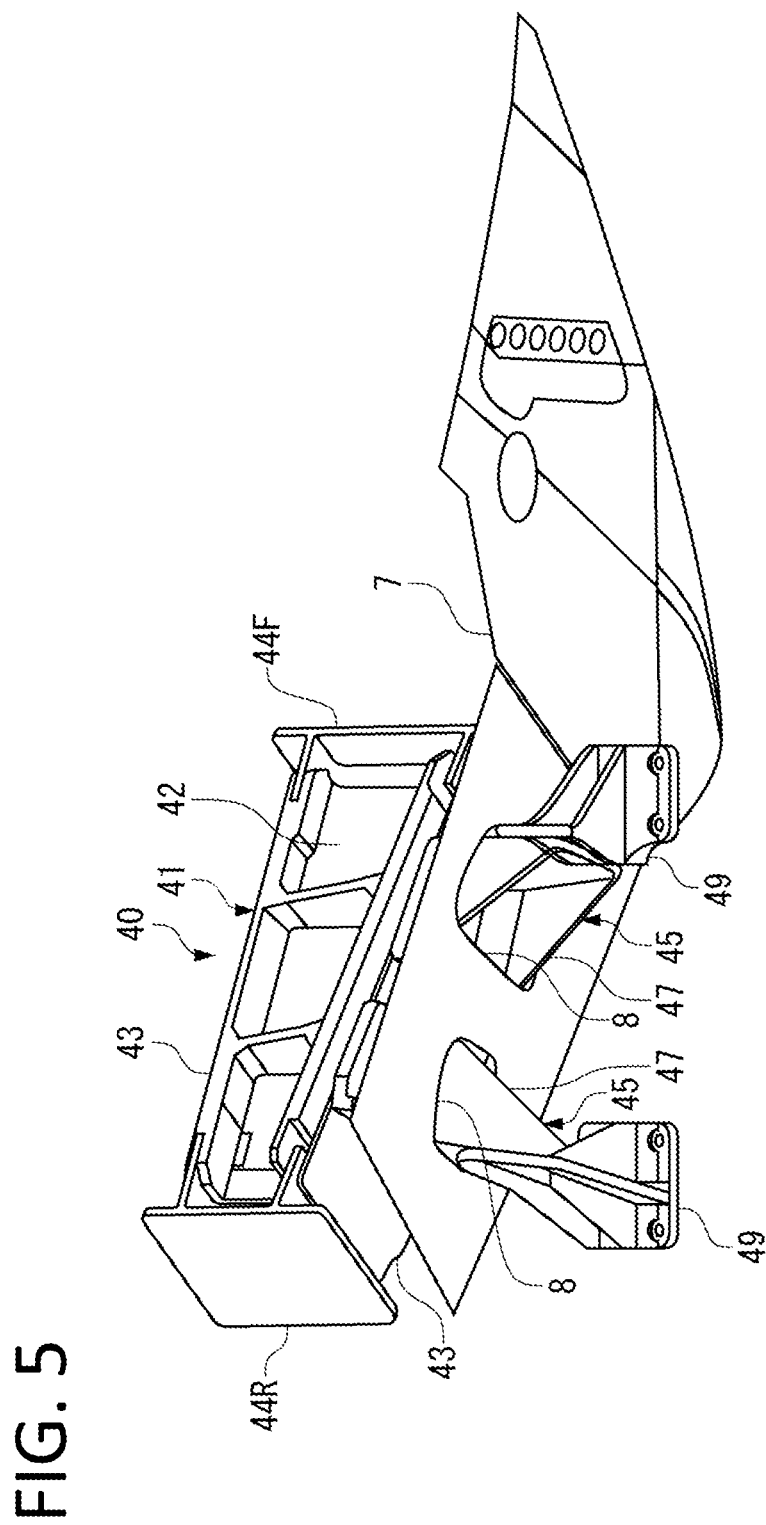
FIG. 5 is a view showing the arrangement of the fixing structure and an access panel in the first embodiment.
Figure 6A:
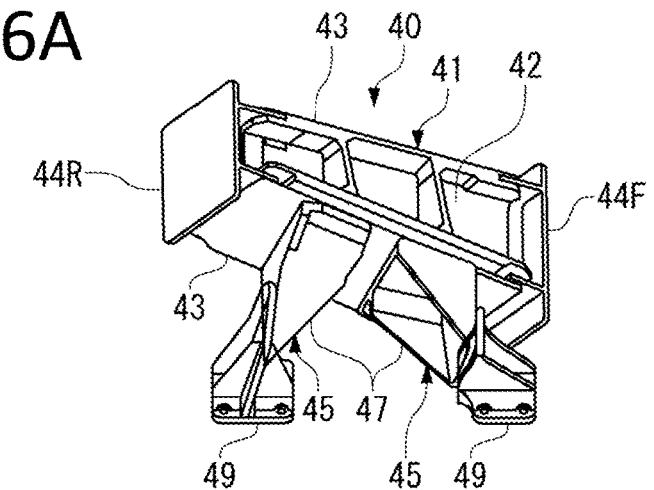
FIG. 6A is a view showing the fixing structure of the first embodiment of which various elements are assembled.
Figure 6B:
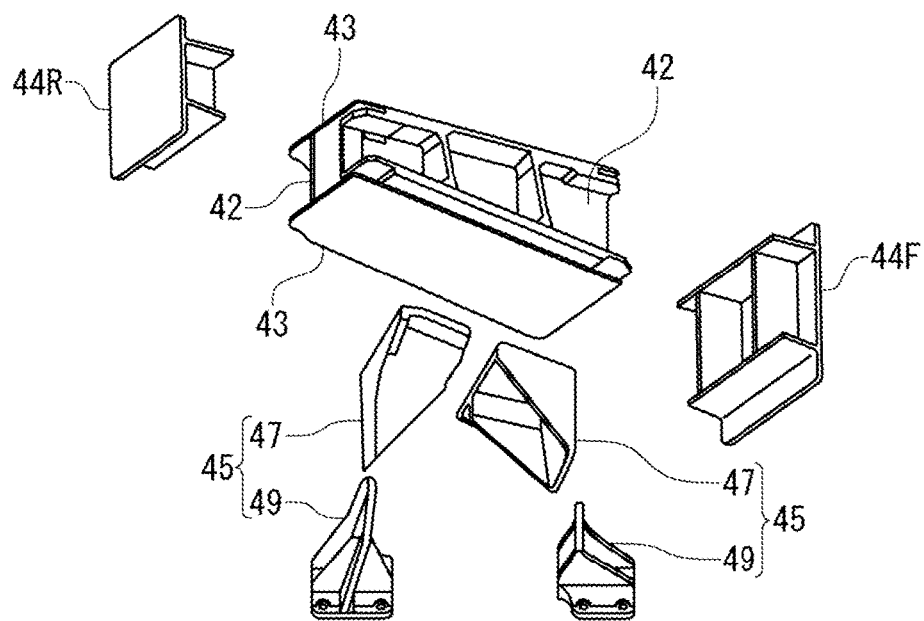
FIG. 6B is a view showing the fixing structure of the first embodiment of which the various elements are disassembled.

When the framework 41 is mounted at a predetermined position, the fitting 45 is passed through a fitting insertion hole 8 which is provided in an access panel 7 (see FIG. 5). The access panel 7 is a member which substitutes for a part of a skin of the lower surface of the main wing 3, and is mounted in place of the skin when the vibration exciter 30 is mounted. In contrast to the skin which covers the inside of the main wing 3 without any gaps, the access panel 7 has the fitting insertion hole 8 formed in it so that the fitting 45 is passed through. A major part of the fitting 45 passed through the fitting insertion hole 8 is exposed to the outside of the main wing 3 (outside of the aircraft), so that the vibration exciter 30, which is mounted on the fitting 45, is also exposed to the outside of the aircraft.

[Mounting of the Framework 41 on the Main Wing 3]

Figure 7:
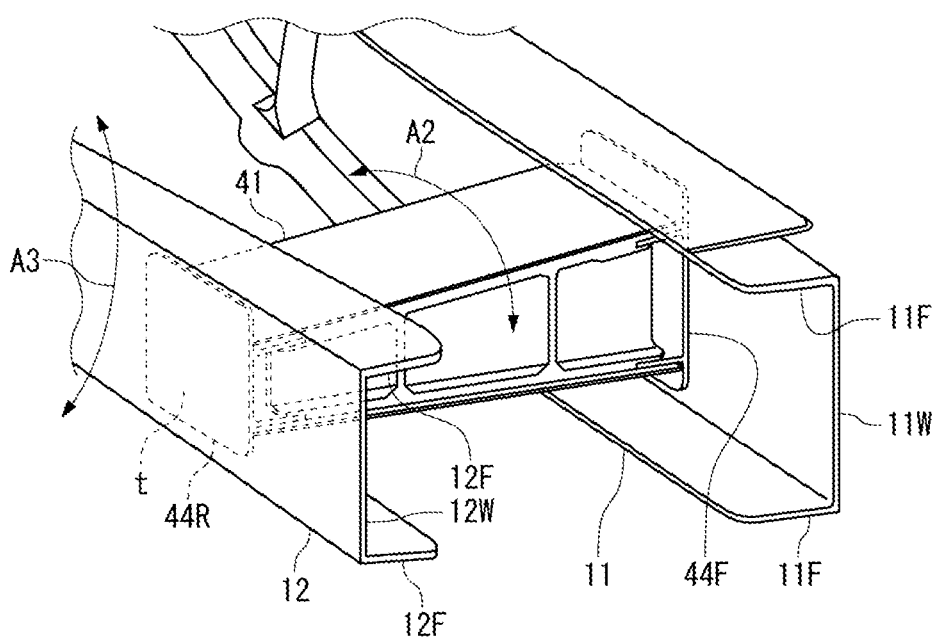
FIG. 7 is a view showing a structure for fixing the fixing structure on a main wing in the first embodiment.

In order to efficiently transmit the vibration of the vibration exciter 30 to the main wing 3, the fixing structure 40 employs a configuration which transmits the vibration of the vibration exciter 30 as a shearing force to the main wing 3. In the following, this will be described with reference to FIG. 7. In FIG. 7, elements other than the front spar 11 and the rear spar 12 of the main wing 3 and elements other than the framework 41 of the fixing structure 40 are not shown.

The framework 41 is fixed across the front spar 11 and the rear spar 12 of the main wing 3.

Here, the front spar 11 and the rear spar 12 are beam-like major structural members which are disposed inside the main wing 3 at a predetermined interval, each along the longitudinal direction of the main wing 3, and bear loads applied to the main wing 3. The front spar 11 includes the web 11W and flanges 11F, 11F, and the rear spar 12 includes the web 12W and flanges 12F, 12F. The web 11W of the front spar 11 is wider (in the upper-lower direction in FIG. 7) than the web 12W of the rear spar 12.

The framework 41 is disposed so as to be orthogonal to the front spar 11 and the rear spar 12, and is fixed so as to connect the front spar 11 and the rear spar 12. More specifically, the joining wall 44F of the framework 41 is fixed on the web 11W of the front spar 11, and the joining wall 44R of the framework 41 is fixed on the web 12W of the rear spar 12. The joining wall 44F occupies substantially the entire area of the web 11W in the width direction (in the upper-lower direction in FIG. 7) without any gaps, and the joining wall 44R occupies substantially the entire area of the web 12W in the width direction without any gaps.

Any means may be used for fixing the joining walls 44F, 44R as long as it is so-called rigid connection which allows forces to be transmitted between the framework 41 and the front and the rear spars 11, 12. For example, means such as fastening the respective peripheral edges of the joining walls 44F, 44R on the webs 11W, 12W with a plurality of fasteners, joining the respective peripheral edges of the joining walls 44F, 44R on the webs 11W, 12W by welding, or joining the respective surfaces of the joining walls 44F, 44R and the opposing surfaces of the webs 11W, 12W with an adhesive, can be adopted.

[Vibration of the Main Wing 3]

Forces transmitted to the main wing 3 through the framework 41 will be described with reference to FIG. 7. Here, as described above, vibration occurs in the framework 41 as indicated by the arrow A2. This vibration transmits as a shearing force τ from the joining wall 44F to the web 11W and from the joining wall 44R to the web 12W, so that vibration swinging in the direction indicated by the arrow A3 occurs in the front spar 11 and the rear spar 12. This direction indicated by the arrow A3 matches the direction of vibration required for evaluation of the vibration resistance of the main wing 3 to flutter.

The vibration excitation system 20 generates the vibration indicated by the arrow A3, so that the vibration resistance of the main wing 3 to flutter can be evaluated.

[Dismounting of the Vibration Excitation System 20]

The state where the vibration excitation system 20 is mounted for flutter evaluation has been described so far. This vibration excitation system 20 can be dismounted. To dismantle the vibration excitation system 20, the fitting 45, the fairing 50, and the vibration exciter 30 are removed while the framework 41 is left fixed on the front spar 11 and the rear spar 12. At the same time, the access panel 7 is removed together, and a skin having the same outer shape as the access panel 7 is fitted on the part where the access panel 7 has been fitted. Thereafter, if a test relating to flutter is to be performed again, this skin is removed, and the fitting 45, the fairing 50, and the vibration exciter 30 are mounted at predetermined positions along with the access panel 7.

To restore the aircraft to its original state, the framework 41 of the vibration excitation system 20 is removed from the front spar 11 and the rear spar 12, and then the skin is fitted on the part where the access panel 7 has been fitted.

Effects of the First Embodiment

The following describes the major effects offered by the first embodiment.

First, the vibration excitation system 20 allows its portion from the fitting 45 downward including the vibration exciter 30 to be removed while leaving the framework 41 fixed on the front spar 11 and the rear spar 12. When the vibration excitation system 20 is not used, the portion of the vibration excitation system 20 exposed to the outside of the main wing 3 is removed while the framework 41, which is not easy to remove from the front spar 11 and the rear spar 12 among the parts of the vibration excitation system 20, is left as is, so that the burden of the removal is reduced.

Secondly, the vibration excitation system 20 transmits the vibration of the vibration exciter 30 as a shearing force through the framework 41, which has a box structure, to the front spar 11 and the rear spar 12 of the main wing 3. Since the front spar 11 and the rear spar 12 are structural members which bear loads applied to the main wing 3, when the vibration generated in the vibration exciter 30 is transmitted to the front spar 11 and the rear spar 12, the vibration can be transmitted efficiently to the main wing 3. Moreover, since the vibration is transmitted as a shearing force to the front spar 11 and the rear spar 12 which are provided at an interval in the front-rear direction, the vibration can be more efficiently transmitted to the main wing 3.

While the framework 41 according to this embodiment has a cuboid box shape, the present invention is not limited to this example, and a differently-shaped framework, for example, a circular cylindrical framework can also be used.

While it is optimal in terms of load transmission that the airflow control wing 35 is mounted at 0 degrees to the wing reference plane, the airflow control wing 35 can also be mounted at an angle to the wing reference plane in consideration of the aerodynamic interference between the winglet 4 and the vibration exciter 30.

While the pair of fittings 45 is provided in this embodiment, this is not essential for the present invention, and a single fitting can also be used as long as it can reliably transmit the vibration generated in the vibration exciter 30 to the framework 41.

Figure 15:
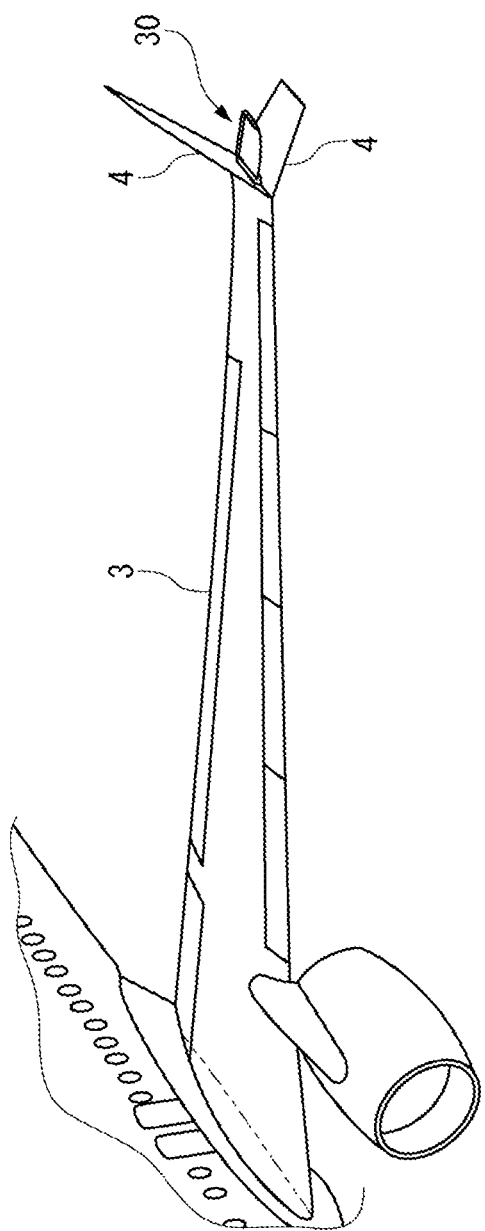
FIG. 15 is a view showing a modified example of the first embodiment.

This embodiment can also be applied where the vibration exciter 30 is mounted on Y-shaped winglets 4. In this case, as shown in FIG. 15, the vibration exciter 30 can be provided between the Y-shaped winglets 4, 4, from the tip of the main wing 3 along the extension direction of the main wing 3.

Second Embodiment

Next, a vibration excitation system 60 according to the second embodiment will be described.

Figure 8:
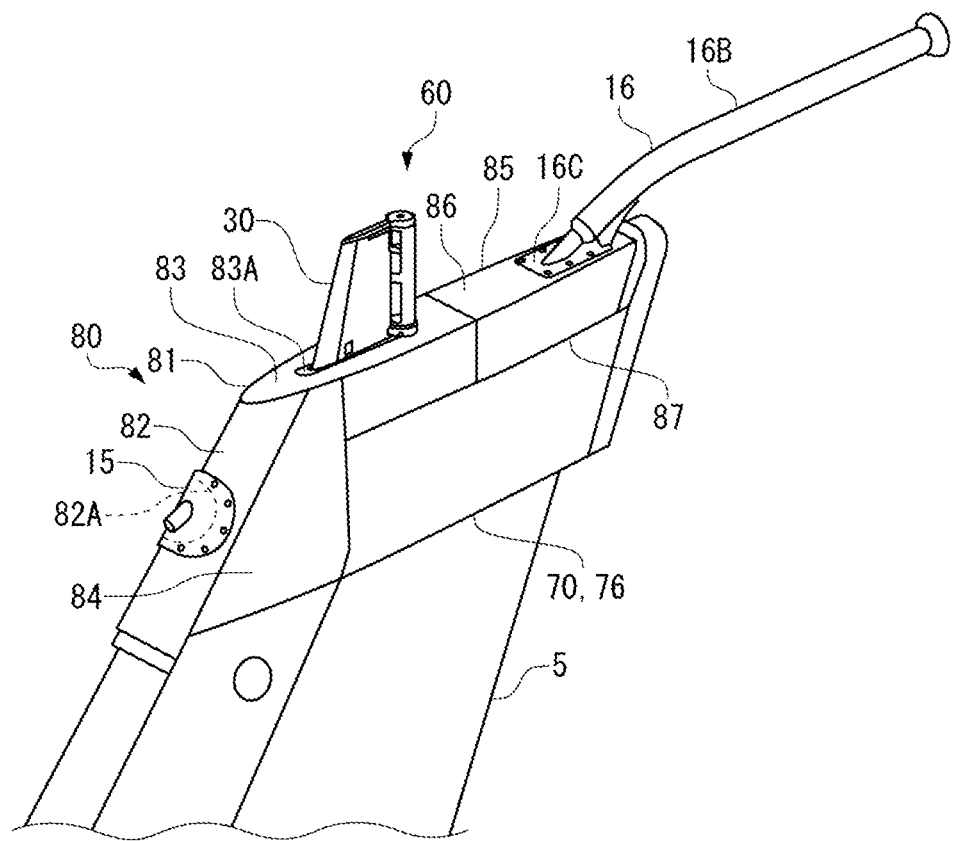
FIG. 8 is an enlarged view of a tip portion of a vertical tail in a second embodiment.

As shown in FIG. 8, the vibration excitation system 60 is used for evaluating the flutter of the vertical tail 5. As other devices for test and evaluation purposes, an outboard camera 15, which images the aircraft 1 from the vertical tail 5, and a guide pipe 16, through which a towing rope to be connected with a trailing corn (Japanese Patent Laid-Open No. 9-20296) is pulled out, are closely provided on the vertical tail 5. In the second embodiment, the following three modes can be selected as necessary: a case (first mode) where the vibration exciter 30 of the vibration excitation system 60 is mounted on the vertical tail 5 along with the outboard camera 15 and the guide pipe 16 and used; a case (second mode) where the vibration exciter 30 is not mounted but only the outboard camera 15 and the guide pipe 16 are mounted on the vertical tail 5 and used; and a case (third mode) where all of the vibration exciter 30, the outboard camera 15, and the guide pipe 16 are removed. Since the vibration exciter 30 composing the vibration excitation system 60 which is the same as that of the first embodiment except in size is used, the specific description of the vibration exciter 30 will be omitted.

In the following, the configuration of the vertical tail 5 including the vibration excitation system 60 will be described.

Figure 9:
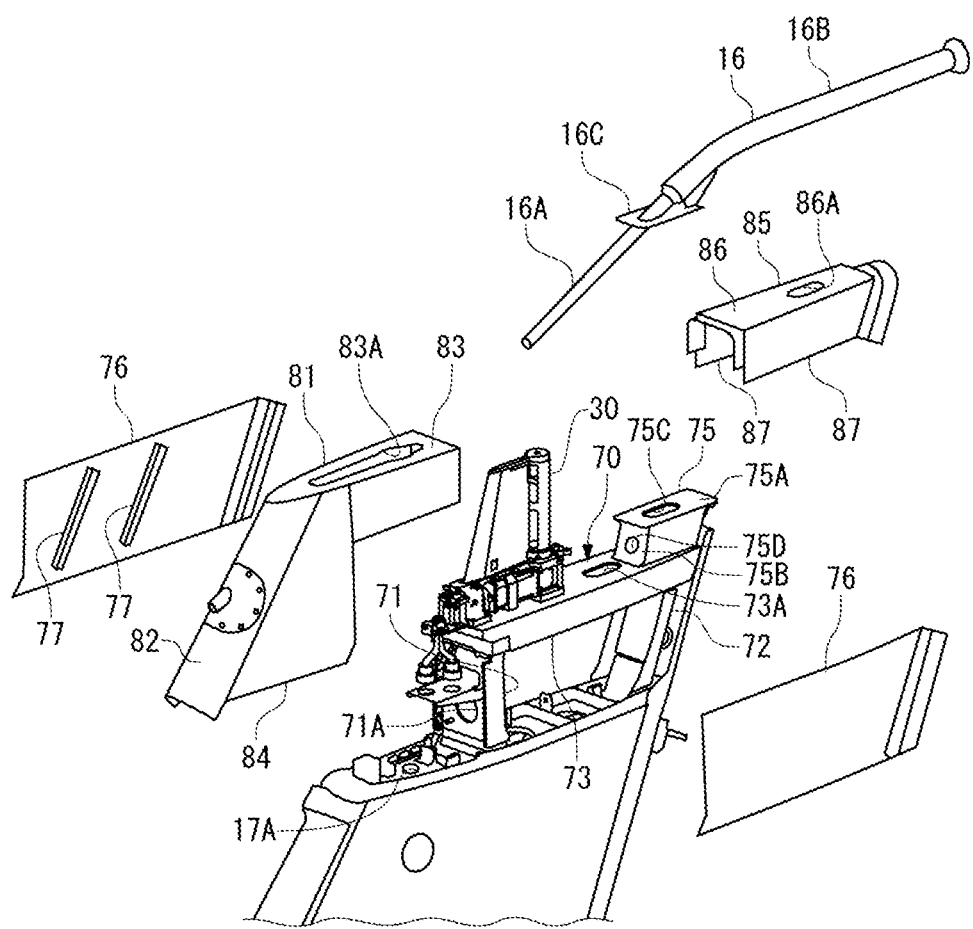
FIG. 9 is an exploded perspective view of FIG. 8.

As shown in FIG. 8 and FIG. 9, the vibration excitation system 60 includes the vibration exciter 30, a fixing structure 70 for mounting the vibration exciter 30 on the vertical tail 5, and a fairing 80 which covers the fixing structure 70 from the front side and the upper side. FIG. 8 shows the first mode where the outboard camera 15 and the guide pipe 16 are mounted along with the vibration excitation system 60. That is, in the first mode, the outboard camera 15 is mounted on an inclined wall 82 of the fairing 80, and the vibration exciter 30 is mounted so that a major part of it is exposed to the outside from a top wall 83 of the fairing 80, and the guide pipe 16 is mounted further on the rear side than the vibration exciter 30.

Instruments including the vibration excitation system 60 are mounted in a narrow space occupied by a tip fairing provided at the tip of the vertical tail 5.

[Fixing Structure 70]

Next, the fixing structure 70 will be described with reference to FIG. 9 to FIG. 11B.

The fixing structure 70 fixes the vibration exciter 30 and the guide pipe 16 on the vertical tail 5.

Figure 10:
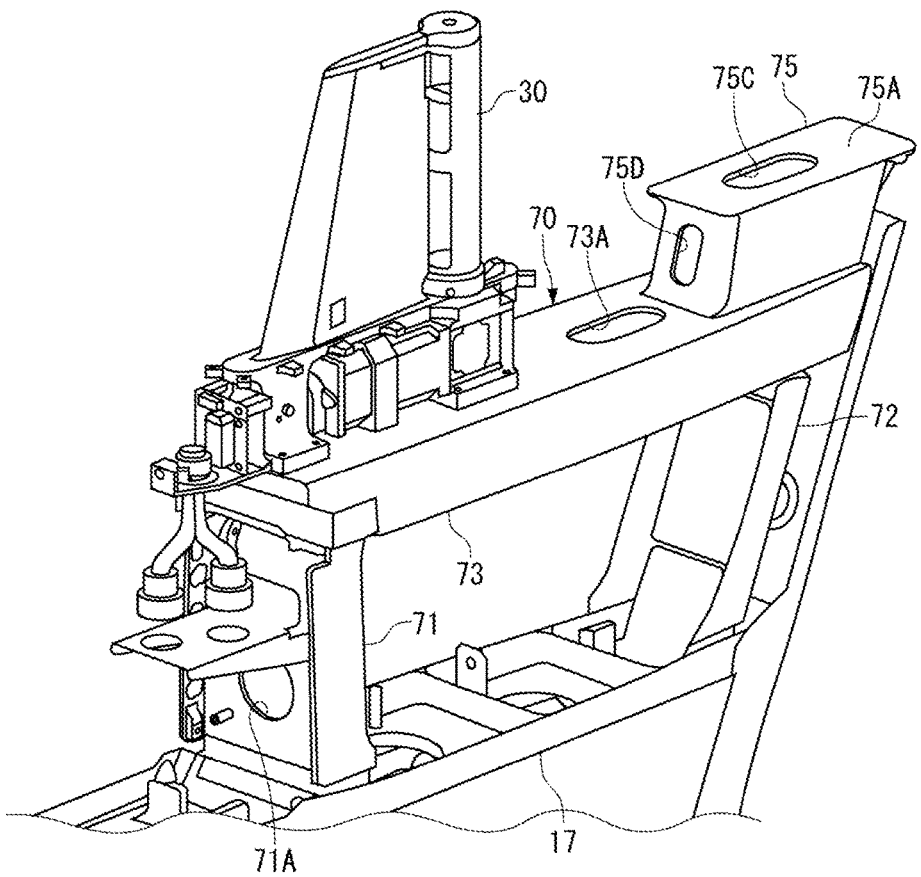
FIG. 10 is a partially enlarged view of FIG. 9.

The fixing structure 70 has a generally box-shaped structure, and is composed of a front column leg 71 and a rear column leg 72 provided at an interval in the front-rear direction, a beam 73 connecting the upper ends of the front column leg 71 and the rear column leg 72, and vertical walls 76, 76 covering the side surfaces. The front column leg 71 and the rear column leg 72 are composed of machined parts cut out of aluminum alloy members, and the beam 73 is composed of a box structure combining machined parts cut out of aluminum alloy members. The front column leg 71, the rear column leg 72, and the beam 73 are rigidly connected with one another. As shown in FIG. 9 and FIG. 10, the vibration exciter 30 is fixed on the beam 73. The front column leg 71 is orthogonal to the beam 73, while the rear column leg 72 is inclined to the beam 73, and this inclination matches the inclination of a rear spar 14 of the vertical tail 5. The fixing structure 70 is configured such that the interval between the tip of the front column leg 71 and the rear column leg 72 (on the opposite side from the side where these are connected with the beam 73) in the front-rear direction matches the interval between a front spar 13 and the rear spar 14 of the vertical tail 5 in the front-rear direction. Any configurations of the front column leg 71, the rear column leg 72, and the beam 73 may be adopted as long as the required strength and rigidity are provided.

The vertical walls 76, 76 have a planar shape which is approximate to that of a region surrounded by the front column leg 71, the rear column leg 72, and the beam 73, and the pair of vertical walls 76, 76 is fixed at both ends in the width direction of the fixing structure 70 so as to cover this region. Thus, since the fixing structure 70 has the box structure including a beam 17, it has enhanced strength and rigidity. Stiffeners 77, 77 are mounted on the opposing surfaces of the vertical walls 76, 76 to further enhance the rigidity.

In addition to the above-described box-shaped basic configuration, the fixing structure 70 further includes a pedestal 75 on which the guide pipe 16 is fixed. The pedestal 75 is a box structure which is fixed at the rear end of the beam 73. The pedestal 75 is provided with insertion holes 75C, 75D, through which the towing rope of the trailing cone is passed, in a top surface 75A and a front wall 75B, respectively. The front column leg 71 is provided with an insertion hole 71A through which an internal guide 16A is passed, and the beam 73 is provided with an insertion hole 73A through which the towing rope being passed through the insertion holes 75C, 75D is passed.

Figure 11A:
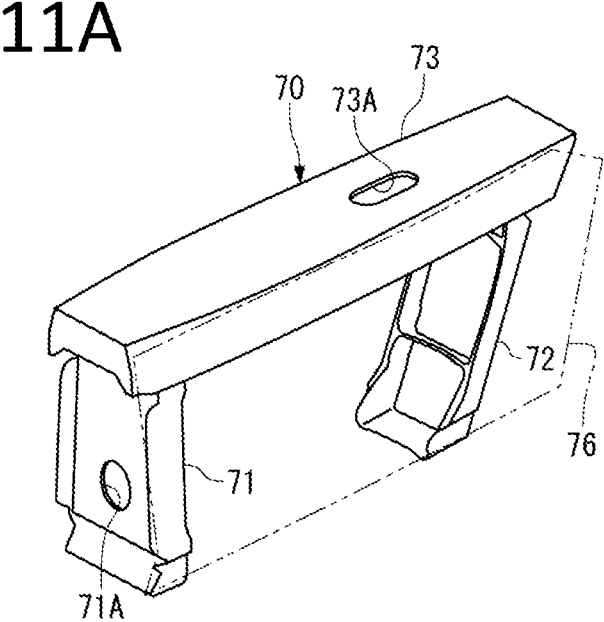
FIG. 11A is a view showing a fixing structure of the second embodiment as a single part.
Figure 11B:
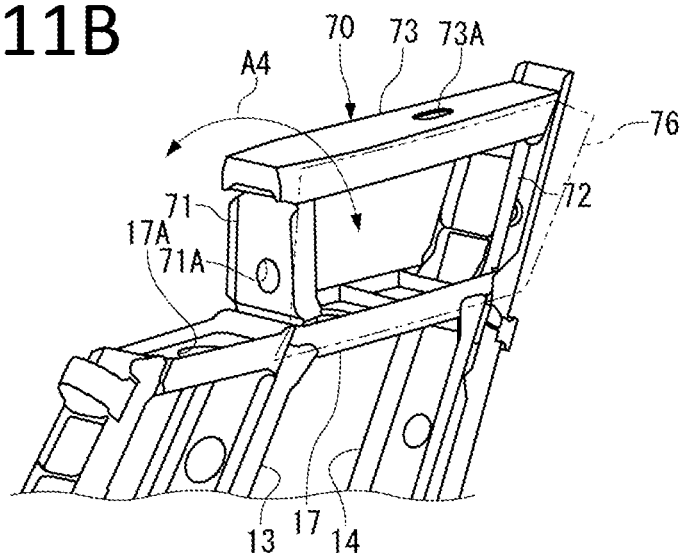
FIG. 11B is a view showing the fixing structure of the second embodiment in its mounted state.

As shown in FIG. 11B, the vertical tail 5, on which the fixing structure 70 is fixed, includes the front spar 13 and the rear spar 14, and the beam 17 connecting the upper ends of the front spar 13 and the rear spar 14. This beam 17 forms a part of the fixing structure 70.

The fixing structure 70 is disposed such that the position of the front column leg 71 in the front-rear direction coincides with that of the front spar 13, and that the position of the rear column leg 72 in the front-rear direction coincides with that of the rear spar 14. The front column leg 71 is rigidly connected with the front spar 13, while the rear column leg 72 is rigidly connected with the rear spar 14. Since the fixing structure 70 is thus fixed on the vertical tail 5, the vibration generated in the front column leg 71 is directly transmitted to the front spar 13, and the vibration generated in the rear column leg 72 is directly transmitted to the rear spar 14.

[Fairing 80]

As shown in FIG. 8 and FIG. 9, the fairing 80 covers the fixing structure 70, a part of the vibration exciter 30, and a part of the guide pipe 16, mounted on the fixing structure 70, respectively.

The fairing 80 includes two elements, a front fairing 81 and a rear fairing 85, which are removably mounted on the vertical tail 5 independently of each other.

The front fairing 81 includes the inclined wall 82, the top wall 83 adjoining to the inclined wall 82, and a pair of side walls 84, 84 adjoining to the inclined wall 82 and the top wall 83. When the front fairing 81 is mounted at a predetermined position of the vertical tail 5, the inclined wall 82 is disposed so as to face the front side. The outboard camera 15 is mounted on the inclined wall 82 of the front fairing 81. The front fairing 81 has an insertion hole 82A (see FIG. 8) formed passing through front and rear thereof. Wiring adjoining to the outboard camera 15 passes through the insertion hole 82A. The front fairing 81 further has an insertion hole 83A, formed in the top wall 83 and passing through upper side to lower side of the front fairing 81. The vibration exciter 30 is passed through the insertion hole 83A.

The rear fairing 85 includes a top wall 86 and a pair of side walls 87, 87 adjoining to the top wall 86. When the rear fairing 85 is mounted at a predetermined position of the vertical tail 5, the pedestal 75 is housed inside the rear fairing 85. The guide pipe 16 is fixed on the pedestal 75 through the top wall 86. The rear fairing 85 has an insertion hole 86A, formed in the top wall 86 and passing through upper side to lower side thereof, further on the inside than the in-plane of a fixing flange 16C, which is the fixing part where the guide pipe 16 is fixed.

The guide pipe 16 is passed through the insertion hole 86A. As shown in FIG. 9, the guide pipe 16 includes an internal guide 16A, an external guide 16B, and the fixing flange 16C provided at the border between the internal guide 16A and the external guide 16B. The internal guide 16A and the external guide 16B of the guide pipe 16 form a hollow structure including the portion of the fixing flange 16C, and the towing rope to be connected with the trailing cone is passed through the inside of the guide pipe 16.

The fixing flange 16C of the guide pipe 16 is fixed on the pedestal 75 with a bolt which reaches the pedestal 75 penetrating through the top wall 86 of the rear fairing 85. Then, the internal guide 16A is disposed inside the fairing 80, and is passed through the insertion holes 75C, 75D of the pedestal 75, and is passed through the insertion hole 73A of the beam 73 and the insertion hole 71A of the front column leg 71, and is further passed through the insertion hole 17A of the beam 17 of the vertical tail 5. On the other hand, the external guide 16B is provided so as to be exposed to the outside of the rear fairing 85.

[First Mode]

Figure 12A:
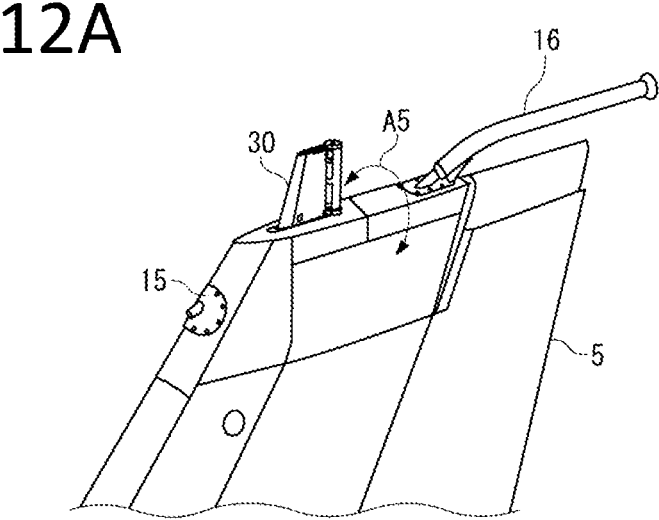
FIGS. 12A and 12B are views illustrating a first mode in the second embodiment.

As shown in FIG. 12A, in the first mode, the vibration exciter 30, the outboard camera 15, and the guide pipe 16 having been described above are mounted at predetermined positions of the vertical tail 5.

The outboard camera 15 images the entire aircraft 1 on the front side than the outboard camera 15, and monitors the performance and characteristics of the fuselage 2 and the main wing 3, as well as a state of ice accretion on the fuselage 2 and the main wing 3. The towing rope to be connected with the trailing cone (not shown) is pulled out of the guide pipe 16.

In the first mode, when the vibration exciter 30 vibrates, the vibration appears in the vibration exciter 30 as a swinging motion around the side of the beam 73 of the fixing structure 70 as indicated by the arrow A4 in FIG. 11B, and this swinging motion transmits as a shearing force to the front spar 13 and the rear spar 14, so that the vibration indicated by the arrow A5 occurs in the vertical tail 5 as shown in FIG. 12A, and the vibration resistance to flutter is evaluated.

Figure 12B:
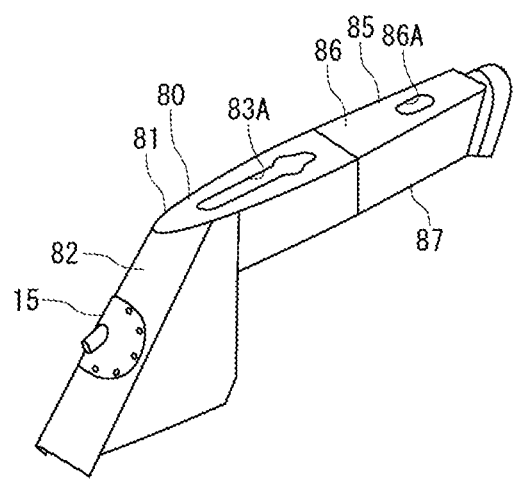

As shown in FIG. 12B, the fairing 80 in the first mode is a combination of the front fairing 81 and the rear fairing 85 as described above.

[Second Mode]

Figure 13A:
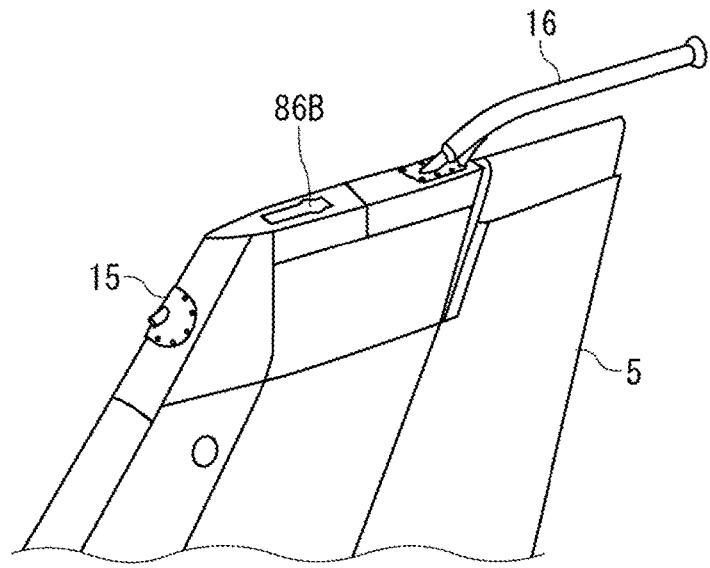
FIGS. 13A and 13B are views illustrating a second mode in the second embodiment.
Figure 13B:
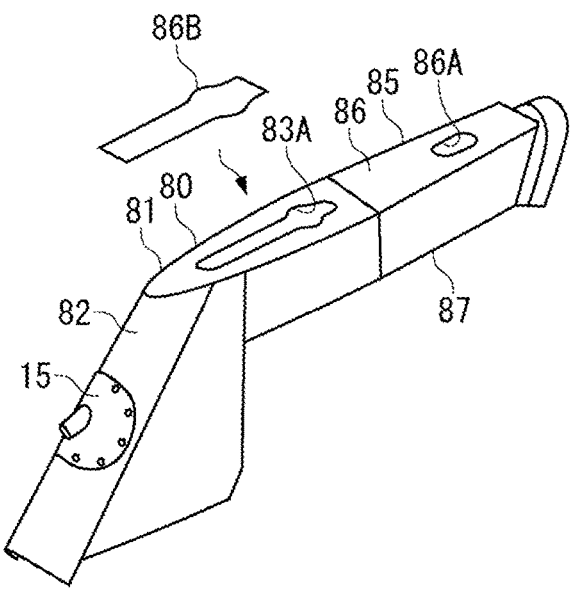

As shown in FIGS. 13A and 13B, in the second mode, the vibration exciter 30 is removed, and the insertion hole 83A, through which the vibration exciter 30 is exposed to the outside, is covered with a cover 86B.

The vibration exciter 30 is removed when establishing the second mode. During this removal work, the front fairing 81 is removed, while the rear fairing 85 can be left mounted on the vertical tail 5, as the front fairing 81 can be mounted/removed independently of the rear fairing 85.

[Third Mode]

Figure 14A:
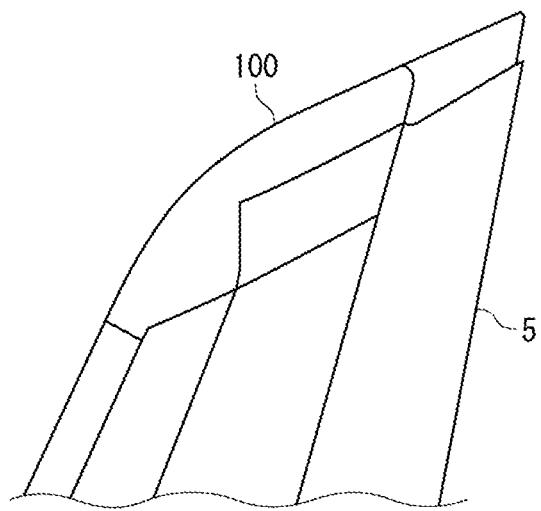
FIGS. 14A and 14B are views illustrating a third mode in the second embodiment.
Figure 14B:
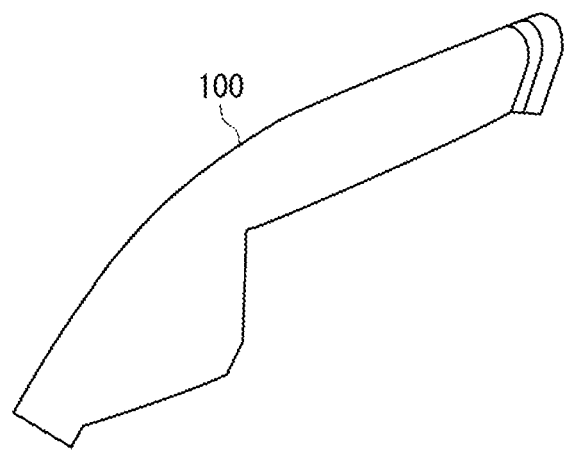

When another test, for example, a test on the flight performance, is performed without using the vibration exciter 30, the outboard camera 15, and the guide pipe 16, these devices are removed, and as shown in FIG. 14A, a fairing 100 for flight performance test is mounted on the vertical tail 5. The external appearance of this fairing 100 is the same as that of the fairing provided on the original vertical tail 5, and the fairing 100 can be mounted using the fixing structure 70.

Effects of the Second Embodiment

The following describes the major effects offered by the second embodiment. First, in the second embodiment, the vibration exciter 30 is mounted on the vertical tail 5 through the fixing structure 70. Thus, the vibration exciter 30 can be removed alone while the fixing structure 70 is left mounted on the vertical tail 5, so that the vibration exciter 30 can be mounted/removed easily without considering the guide pipe 16 being mounted on the fixing structure 70.

Secondly, in the second embodiment, since the vibration excitation system 60 can transmit the vibration of the vibration exciter 30 as a shearing force to the front spar 13 and the rear spar 14 of the vertical tail 5 through the fixing structure 70 having a box structure, the vibration generated in the vibration exciter 30 can be transmitted efficiently to the vertical tail 5.

Thirdly, in the second embodiment, the fairing 80 is composed of the two members: one is the front fairing 81 corresponding to the vibration exciter 30 and the outboard camera 15, and the other is the rear fairing 85 corresponding to the guide pipe 16. Therefore, when the first mode is shifted to the second mode by removing the vibration exciter 30, the rear fairing 85 can be left as is and only the front fairing 81 has to be removed, so that the burden of the removal work can be reduced.

Apart from the above-described examples, the configurations presented in the above-described embodiments may be sifted through or appropriately changed into other configurations within the scope of the present invention.

For example, while the main wing and the vertical tail have been described above, the present invention can also be applied to a horizontal tail.

In addition, the inclination of the vibration exciter 30 relative to the main wing 3 can be set in consideration of the rate of load transmission from the vibration exciter 30 to the main wing 3 and the aerodynamic interference by the winglet 4.

What is claimed is:

1. A vibration excitation system for an aircraft subjected to a test flight for evaluation of vibration resistance to flutter, the vibration excitation system comprising:
   a vibration exciter; and
   a fixing structure removably mounting the vibration exciter on one of a main wing and a tail of the aircraft,
   wherein the vibration exciter is configured to impart vibration to the aircraft,
   wherein the fixing structure is configured to transmit the vibration of the vibration exciter as a shearing force to a front spar and a rear spar of one of the main wing and the tail,
   wherein the fixing structure comprises a box structure that is independent from the front spar and rear spar, and
   wherein the box structure comprises:
      a front joining portion that is fixed on the front spar,
      a rear joining portion that is fixed on the rear spar, and
      one or more connecting members disposed between the front joining portion and rear joining portion that connect the front joining portion and rear joining portion.

2. The vibration excitation system for an aircraft according to claim 1, wherein the box structure transmits the vibration of the vibration exciter to the front spar and the rear spar along a direction of the vibration which matches a direction required for evaluation of the vibration resistance.

3. The vibration excitation system for an aircraft according to claim 1, wherein the vibration exciter is removably mounted on the fixing structure through a fitting and is configured to be mounted on or removed from the fixing structure along with the fitting.

4. The vibration excitation system for an aircraft according to claim 1, wherein the vibration exciter is mounted through the fixing structure, in the vicinity of a tip of the main wing having a winglet at the tip.

5. The vibration excitation system for an aircraft according to claim 1, wherein, in addition to the vibration exciter, a single or a plurality of devices used for other tests are mounted on the fixing structure.

6. The vibration excitation system for an aircraft according to claim 5, wherein the vibration exciter is configured to be mounted on or removed from the fixing structure independently of the single or the plurality of devices.

7. The vibration excitation system for an aircraft according to claim 5, wherein the vibration exciter is provided on a vertical tail through the fixing structure.

8. The vibration excitation system for an aircraft according to claim 6, wherein the vibration exciter is provided on a vertical tail through the fixing structure.

9. The vibration excitation system for an aircraft according to claim 1, wherein the box structure is fixed so as to connect the front spar and the rear spar.

10. The vibration excitation system for an aircraft according to claim 1, wherein:
the front joining portion of the box structure occupies an area of the front spar that spans substantially an entire width of the front spar, and
the rear joining portion of the box structure occupies an area of the rear spar that spans substantially an entire width of the rear spar.

11. The vibration excitation system for an aircraft according to claim 5, wherein the fixing structure is covered by a fairing.

12. The vibration excitation system for an aircraft according to claim 11, wherein the fairing covers a part of the vibration exciter and a part of the single or the plurality of devices.

13. The vibration excitation system for an aircraft according to claim 11, wherein the fairing comprises a first fairing and a second fairing that are removably mounted on the vertical tail independently of each other.

14. An aircraft comprising the vibration excitation system according to claim 1.

15. The vibration excitation system for an aircraft according to claim 1, wherein the front joining portion and rear joining portion each comprises a joining wall that is vertically aligned, further wherein the one more connecting members comprises a pair of horizontal walls vertically spaced from each other and a pair of vertical walls that are horizontally spaced from each other.

16. The vibration excitation system for an aircraft according to claim 1, wherein:
the vibration exciter is removably mounted to the fixing structure via a fitting, and
the fitting comprises an upper fitting removably attached to a lower fitting, the upper fitting being removably attached to the fixing structure and the lower fitting being removably attached to the vibration exciter.

* * * * *